United States Patent
Lindner

(10) Patent No.: US 6,773,794 B2
(45) Date of Patent: Aug. 10, 2004

(54) CONSTRUCTION PANEL

(75) Inventor: Melvin Lindner, Woodbury, NY (US)

(73) Assignee: Fairmount Distributors, Inc., Jersey City, NJ (US)

(*) Notice: Subject to any disclaimer, the term of this patent is extended or adjusted under 35 U.S.C. 154(b) by 8 days.

(21) Appl. No.: 10/337,487

(22) Filed: Jan. 8, 2003

(65) Prior Publication Data

US 2004/0131833 A1 Jul. 8, 2004

(51) Int. Cl.$^7$ ................................................ B32B 13/10
(52) U.S. Cl. .................... 428/294.7; 428/365; 428/401; 52/239; 160/131
(58) Field of Search ............................... 52/238.1, 239; 160/131; 428/294.7, 365, 401

(56) References Cited

U.S. PATENT DOCUMENTS 5,362,923 A * 11/1994 Newhouse et al. ........... 174/48
6,444,757 B1 * 9/2002 Righettini ................... 525/302

* cited by examiner

*Primary Examiner*—Merrick Dixon

(57) ABSTRACT

The addition of a small amount of plastic fibers to a mix of inorganic magnesium compound, water and other substances adapted to be extruded to form a synthetic construction panel will significantly reduce the degree of slumping which the extruded material will exhibit.

13 Claims, No Drawings

CONSTRUCTION PANEL

BACKGROUND OF THE INVENTION

This invention relates to fabricated construction panels, and in particular to such panels which are formed by mixing a plurality of substances and forming the mixture into a layer which is placed on a supporting surface and caused to set and thereby form a panel which can be used for structural purposes. One such construction panel known to the art is formed of a combination of inorganic magnesium compounds, water and other substances which, after being mixed, is extruded onto a supporting surface and is then permitted to stand for a period of time while the extruded slurry sets into relatively rigid form. During that setting the extruded layer tends to slump at the edges, so that the edge portions thus produced diminish in thickness, usually progressively toward the edge. Construction panels must usually be provided with uniform thickness, and hence once the slurry has set it becomes necessary to cut off and discard those edge portions of diminishing or diminished thickness. This represents economic waste which contributes to the manufacturing cost of the panels. Thus minimization of the slurrying tendency of the material is highly to be desired.

Specifically, a construction panel with square edges and with substantially desirable properties—e.g., it is non-combustible, does not disintegrate when immersed in water, does not support insect life, is non-nutrient to mold or fungus, and has desirable strength properties—has been formed by mixing magnesium oxide, magnesium chloride, talcum powder, wood bran, and glass fiber cloth with water and a catalyst agent, and the viscous slurry thus produced is extruded onto a supporting form such as a sheet of plastic and permitted to set. Slumping occurs at the edges, and because construction panels must, as a general matter, have square edges, the slumped edge portions of the set panel must be removed, with consequent economic loss.

I have discovered that the degree of slumping which this type of material will exhibit during setting may be very significantly reduced by the addition to the slurry, before the material is extruded, of a small amount of plastic fibers on the order of about 0.1 percent by weight of the entire slurry. The additional cost involved in adding these fibers is insignificant compared to the savings which result from having to cut away and discard smaller slumped edges of the extruded sheet.

DESCRIPTION OF THE PREFERRED EMBODIMENT

There are many structural sheets which have been fabricated for use as constructional elements for such structures as external walls, roofs, subfloors and internal walls. Such structures must have desirable physical properties such as flexural strength, shear strength and impact resistance. Other desirable characteristics are resistance to flame, lack of smoke propagation, retention of characteristics when exposed to water, lack of support of insect life and resistance to mould or fungus. One such panel which has been devised is manufactured from mineral components, with fibrous reinforcement, and does not contain any toxic ingredients, nor does it include asbestos, and is therefore quite desirable. Sheets with a thickness of 10 mm or 14 mm and of substantial area may be made of that material and subsequently cut into individual panels, a standard size of which is 4'×8', but it will be appreciated that these dimensions are but typical. Such panels may be cut, trimmed, drilled or shaped with ordinary power or hand tools and may be fastened to supporting structures using screws or nails. The constituents of which such construction panels are composed are as follows:

| Composition | Weight Range +/− 2% | Preferred Weight |
| --- | --- | --- |
| MgO | 50% | 48.8% |
| $MgCl_2$ | 10% | 10.7% |
| Water | 30% | 31.2% |
| Finely powdered stone | 5% | 4.9% |
| Pulverized wood fiber | 3% | 2.4% |
| Synthetic fiber cloth | 2% | 2.0% |

The finely powdered stone is a filler designed to give the end product a smooth surface when that is desired, and is preferably talcum powder. The pulverized wood fiber may be sawdust or wood bran. The glass or synthetic fiber cloth is an open-weave cloth and is preferably glass fiber.

To make the panel the constituents other than water are thoroughly mixed, as in a cement mixer, after which the water and, preferably, a catalyst such as a mixture in even proportions by weight of urea and poly(oxypropylene) monomethyl ether, is added in an amount of 0.23%+/−0.1% by weight. The slurry thus produced is then extruded onto a suitable supporting form, such as a flat sheet of plastic, producing on that form a sheet of materials of length, width and thickness such that structural panels of desirable dimensions will be produced. The material is then allowed to set. This usually takes a minimum of 6–8 hours, but normally in production it is permitted to set overnight.

Although the originally extruded sheet is generally of uniform thickness, the fact that it is viscous while it is setting results in a progressive change of shape at the edge portions which slump to produce edge sections of decreasing thickness. Since it is undesirable for an individual structural panel cut from the said sheet to have an edge other than a square shape the slumped edge portions of the said sheet must be cut from the remainder of the sheet and discarded. In the past the width of those slumped edge portions has been appreciable, and the consequent waste has been economically appreciable.

I have discovered that the width of the slumped edge portions of the sheet, and hence the economic loss attributable thereto, may be significantly decreased, with a 60–80% improvement, by adding to the mixture of starting materials a small amount of fine plastic fibers, such as those having a diameter of 1–3 microns and a length of ⅜–1 inches. Polyester fibers are preferred, but the fibers may be from nylon, acrylic, or acetate resins and blends thereof. The amount of fiber needed to produce the desired results is very small, about 1 lb of fibers per cubic yard of material, or about 0.09–0.11 percent by weight with 0.11 percent preferred, being effective. Using the fibers does not adversely affect the end properties of the structural panels produced, but, as described, does greatly improve the processing.

Through the use of my invention the very desirable synthetic construction panel previously available, which is in competition with panels of other compositions, may now be manufactured more readily and at lesser expense than has heretofore been possible. This represents a significant competitive advantage.

It will be appreciated that what has been here described is a preferred embodiment, and that many variations may be made therein, all within the scope of my invention as defined in the following claims.

I claim:

1. In a construction panel comprising a mixture of inorganic magnesium compounds, pulverized wood fibers, water and glass or synthetic fiber cloth which is formed as an edged layer on a support and permitted to set, the improvement which comprises the addition thereto of a small amount of fine plastic fibers, thereby to minimize the slumping of said layer at its edges during setting.

2. The construction panel of claim 1, in which said plastic fibers are provided in an amount equal to about 0.09–0.11 percent by weight of the total material.

3. The construction panel of claim 1, in which said plastic fibers are approximately 1–3 microns in diameter.

4. The construction panel of claim 1, in which said plastic fibers are approximately 1–3 microns in diameter and are provided in an amount equal to about 0.9–0.11 percent by weight of the total material.

5. The construction panel of claim 1, in which said plastic fibers have a composition selected from polyester, nylon, acrylic, acetate, and combinations thereof.

6. The construction panel of claim 1, in which said plastic fibers are polyester.

7. The construction panel of claim 1, in which said plastic fibers are provided in an amount of about 0.1 percent by weight of the total material.

8. The construction panel of claim 1, in which said plastic fibers are between about ⅜–1 inch in length.

9. The construction panel of claim 4, in which said plastic fibers have a composition selected from polyester, nylon, acrylic, acetate, and combinations thereof.

10. The construction panel of claim 9, in which said plastic fibers are between about ⅜–1 inch in length.

11. The construction panel of claim 9, in which said plastic fibers are provided in an amount of about 0.1 percent by weight of the total material.

12. The construction panel of claim 9, in which said plastic fibers are polyester.

13. The construction panel of claim 2, in which said plastic fibers have a composition selected from polyester, nylon, acrylic, acetate, and combinations thereof.

* * * * *